Figure 7:
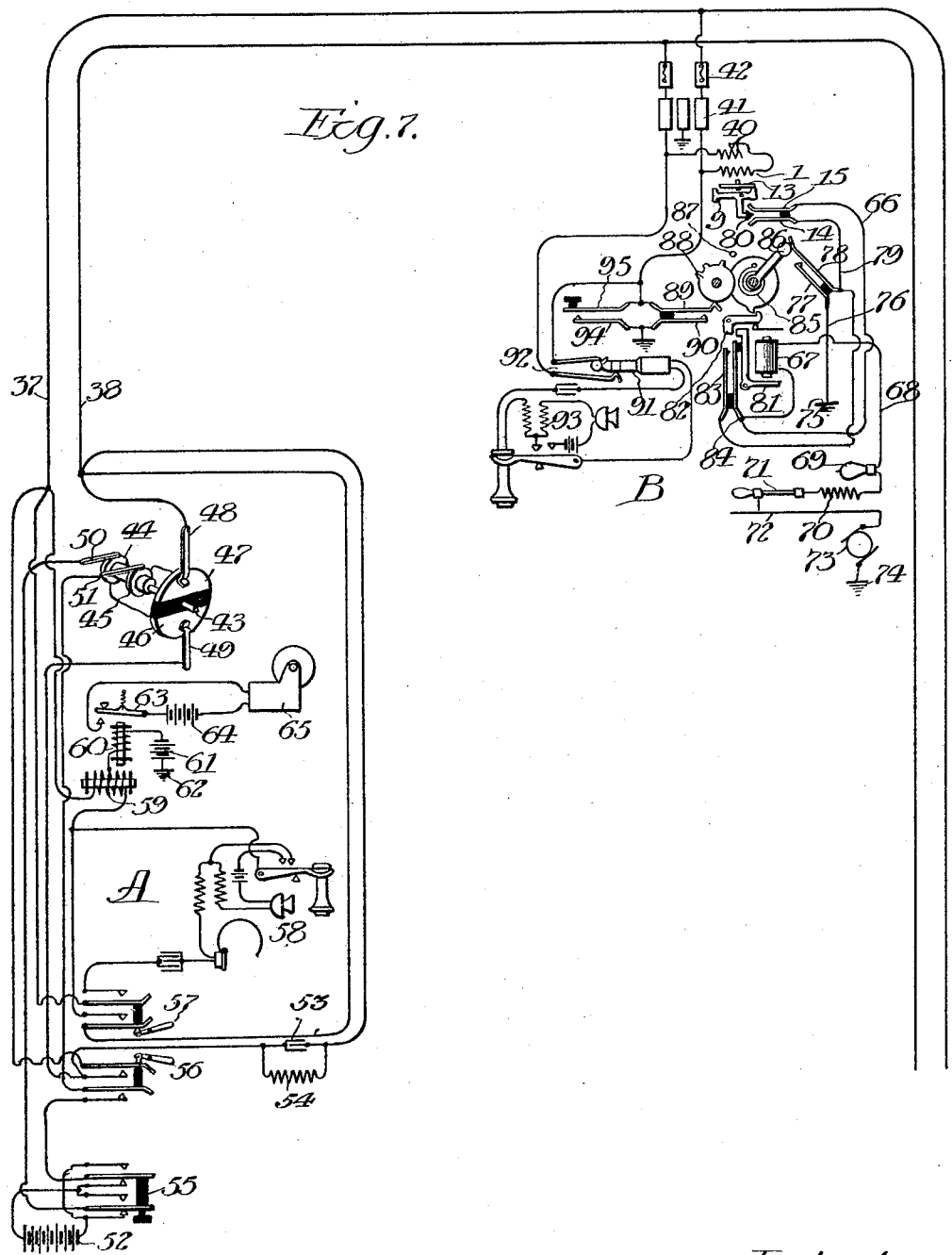

O. T. LADEMAN.
SELECTIVE SIGNALING SYSTEM.
APPLICATION FILED APR. 30, 1912.
1,121,562.
Patented Dec. 15, 1914.
2 SHEETS—SHEET 1.
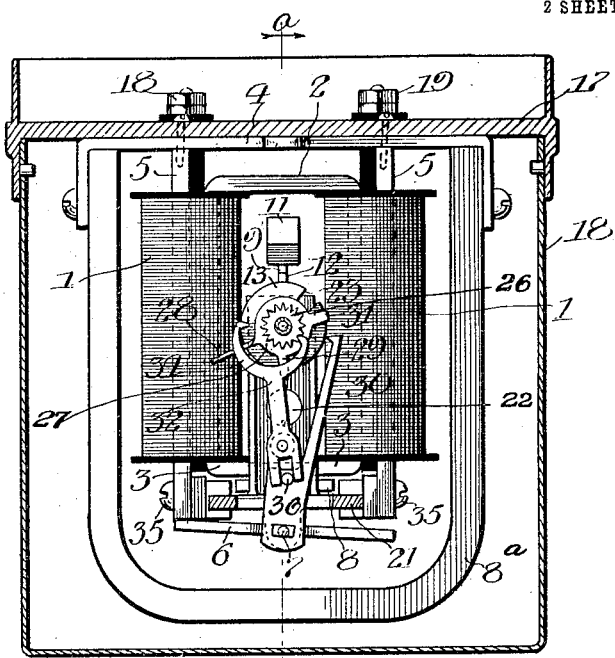
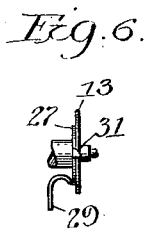
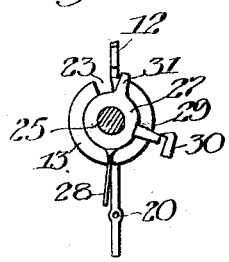
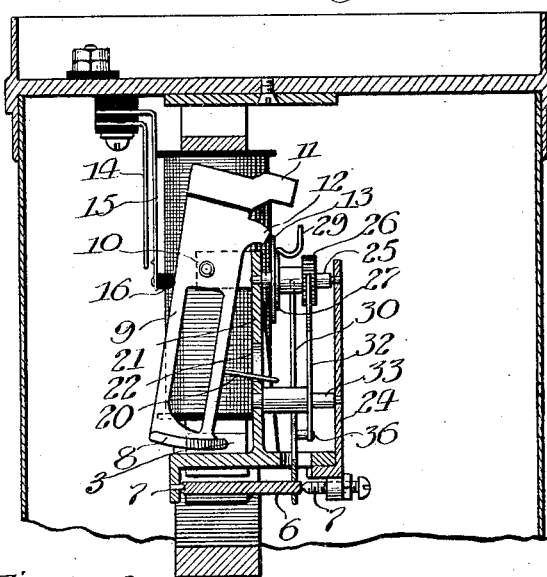
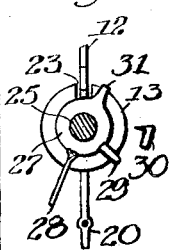
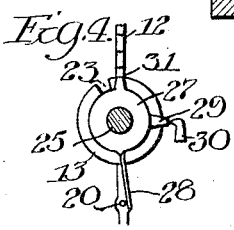
Witnesses
O. M. Wernuel
Hazel Jones
Inventor
Otto T. Lademan
by Max W. Zabel
Atty.

O. T. LADEMAN.
SELECTIVE SIGNALING SYSTEM.
APPLICATION FILED APR. 30, 1912.

1,121,562.

Patented Dec. 15, 1914.

2 SHEETS—SHEET 2.

Witnesses

Inventor
Otto T. Lademan
by *May W. Babel*
Atty.

UNITED STATES PATENT OFFICE.

OTTO T. LADEMAN, OF MILWAUKEE, WISCONSIN, ASSIGNOR TO MORSE CODE SIGNAL COMPANY, OF MILWAUKEE, WISCONSIN.

SELECTIVE SIGNALING SYSTEM.

1,121,562.     Specification of Letters Patent.     Patented Dec. 15, 1914.

Application filed April 30, 1912. Serial No. 694,214.

*To all whom it may concern:*

Be it known that I, OTTO T. LADEMAN, a citizen of the United States, residing at Milwaukee, in the county of Milwaukee and State of Wisconsin, have invented a certain new and useful Improvement in Selective Signaling Systems, of which the following is a full, clear, concise, and exact description, reference being had to the accompanying drawings, forming a part of this specification.

My invention relates to signaling systems and has for its object the provision of an improved selective signaling system of the step-by-step variety and also novel features in connection with answer-back arrangements in connection with signaling systems of this character.

My invention is of particular utility in connection with railway lines and in the description herein I will describe a system embodying my invention which is of particular utility in connection with an electric railway line.

Of course, the specific description in this application of one form of carrying out the invention is naturally not intended to limit the invention, but this specific description is illustrative in character, from which the broad features of the invention may be readily deduced as pointed out in the appended claims.

I will describe this particular embodiment of my invention in connection with the accompanying drawings illustrating the same applied as aforesaid, in which:

Figure 1 is a side view of an improved selector constructed in accordance with my invention, the casing whereof is shown in section; Fig. 2 is a partial sectional view on line *a—a* of Fig. 1; Figs. 3, 4, 5 and 6 are views illustrating the various operative positions of a movable element of the device, and Fig. 7 is a diagrammatic circuit arrangement showing the inclusion of the selector in a signaling system.

I will describe firstly a specific embodiment of a selector which may operate in accordance with my invention by particular reference to Figs. 1 to 6 inclusive. This selector operates in general along the lines set forth in the patent to W. S. Burnett, No. 970,180, issued Sept. 13, 1910. I thus have two coils 1, 1 forming a single winding which magnetize two separate and distinct magnetic circuits. The first magnetic circuit consists of the essential C shaped core 2 whose legs pass interiorly of the coils 1, 1 and terminate in pole pieces 3, 3, and thus form one magnetic circuit; the other magnetic circuit comprises the heel piece 4 and the cores 5, 5 which project through the coils 1, 1.

An armature 6 oscillatingly mounted upon pivots 7, 7 is associated with the cores 5, 5 and this armature is polarized by the permanent magnet $8^a$ so that this armature 6 occupies either one or the other of its two alternative positions, depending upon the polarity of the current last impressed on the coils 1, 1. An alternating current through the coils 1, 1, will of course oscillate the armature 6 with a frequency equal to the frequency of the impressed alternating current provided naturally the frequency is not too high to permit the said armature 6 to follow properly.

A second armature 8 is mounted in close proximity to the pole pieces 3, 3 and is secured to a swinging element 9 pivoted at 10, which swinging element by reason of its overweight 11 tends normally to occupy the position shown in Fig. 2. When any character of current, however, is impressed on the coils 1, 1, whether alternating or direct, the swinging element 9 is rotated contra-clockwise (Fig. 2) a few degrees sufficient to withdraw a projection 12 of this swinging element away from a rotatable plate 13, and likewise sufficient to close contact between springs 14 and 15 through the agency of the insulating button 16 preferably fastened to the spring 15 and abutting against this swinging element 9. This swinging element 9 has its central vertically arranged portion preferably plate shaped and the armature 8 forms a segmental piece at right angles to this plate shaped portion 9 so that this armature 8 is substantially parallel to the pole pieces 3, 3.

The magnetic elements above referred to are all suitably mounted upon a supporting plate 17 to which a hood 18 may be fastened so as to entirely inclose the working portions, binding posts such as 18 and 19 being provided to carry the circuit from without to within the inclosed portion of the device. The swinging element 9 likewise carries a pin 20 whose purpose will be explained later.

A framework 21 of non-magnetic material is suitably secured between the cores 5, 5 by means of the screws 35, 35 and carries certain operating parts as will presently appear. An opening 22 in this framework permits the pin 20 to project therethrough freely.

The rotatable plate 13 is provided with a notch 23, which notch is angularly displaced in the different selectors corresponding to different substations, to thereby control the selective feature of the device. This plate 13 is pivotally mounted between the framework 21 and an upright 24 secured to the framework 21, a shaft 25 being provided for this purpose. This shaft 25 likewise carries a toothed wheel 26 and a pronged plate 27, which plate 27, plate 13 and wheel 26 are securely fastened to the shaft 25. The plate 27 has three projecting elements, one an arm 28 which is used to come into contact with the pin 20 when the devices are being restored to their normal position; an arm 29 adapted to contact with a limit guard or arm 30 fastened to the armature 6 and movable therewith so as to prevent further operative rotation of the wheel 26 by the armature 6 when the arm 28 engages the pin 20; and an L shaped arm 31 projecting toward the periphery of the plate 13 and then downwardly therefrom so as to be engaged by the projection 12 after the entire signaling and restoring operation has ceased, so as to move the shaft 25 a space of one-half cycle into its initial starting position to thereby carry the arm 28 out of the path of the pin 20. The downwardly projecting portion of the arm 31 is more clearly illustrated in Fig. 6 from which it will be apparent that when this cam shaped projection of the arm 31 is engaged by the projection 12 of the movable element 9 that the movable elements carried by the shaft 25 are rotated a short space to bring them to their starting position.

In order to set the device an escapement lever 32 is provided which is secured to the shaft 33 pivotally mounted between the standard 24 and the framework 21. This lever 32 has the arms 34, 34, whereby an oscillation of this arm causes a rotation of the shaft 25 by reason of the engagement of the prongs of the arms 34 with the toothed wheel 26. This is along the general lines of well known escapement mechanism and need not probably be further explained here.

In the operation of my device I utilize preferably alternating currents or their equivalent and each cycle of current, that is, one positive and one negative impulse move the rotatable elements one step. Thus for each cycle there is one engagement between the wheel 26 and each one of the prongs carried by the arms 34. Naturally if but a half cycle is sent of such polarity to reverse the position of the armature 6, then the movable elements rotate but one-half step. This oscillating arm 32 is oscillated by means of a pin 36 carried by the arm 30. Thus whenever the armature 6 oscillates, the escapement arm 32 is oscillated and thereby the selective elements of the device are rotated therein. Now assume that the device is in the position shown in Fig. 3 which is the starting position, assuming also that the armature 6 is in the position shown in Fig. 1 as the armature is always supposed to occupy a normal position on one side by reason of the fact that the last impulse always to be sent out is supposed to be of a given predetermined polarity. It is likewise assumed that the slot 23 is placed in such a position that two complete cycles must be sent in order for this particular device to respond. Assume then that two complete cycles, that is, two positive and two negative impulses are received by the armature, then each arm of the escapement mechanism will have engaged the wheel 26 twice and it will have moved four half steps. The initial impulse likewise rotates the swinging element 9 in a contra-clockwise direction so that its projection 12 is away from the periphery of the wheel 13 and it remains in this position during the sending of the impulses. After the impulses have finally ceased, this arm 9 swings around by reason of the weight 11 and the projection 12 enters the notch 23 in which position, circuit is closed between springs 14 and 15. Of course, only those devices respond in which the notches directly register with the projection 12 as shown in Fig. 5, because in the other devices the projection merely falls against the periphery of the wheel 13 and in such a position the contact between the springs 14 and 15 is not closed. Assuming now that the station has been called and it is desired to restore the devices to normal, then additional impulses are sent to move the rotatable element progressively around so as to complete its rotation back to its starting point. The armature 6 is thereby oscillated by additional impulses, the first impulse having withdrawn the projection 12 from the notch 23 and these impulses are sent in a number exceeding the number required to complete the rotation back to the starting point of the wheel 26. The element 9, however, being in its attracted position has pushed the pin 20 into the path of the arm 28 as shown in Fig. 4 and thus the movable elements move only to the position indicated in Fig. 4, irrespective of the excessive number of cycles received. In this position illustrated in Fig. 4 the arm 30 likewise is opposite the arm 29 and even though excessive cycles are received the escapement element 32 no longer engages the teeth of the wheel 26 as the armature 6 is prevented from moving its required operative distance by the engagement of its arm with the stop 29. Finally, however, the impulses cease, leaving the armature 6 in the position shown in Fig. 1 and likewise permitting the swinging element 9 to assume the position shown in Fig. 2. While this element 9 is assuming this position, its projection 12 engages the cam shaped portion of the arm 31 and rotates the movable elements a half step into the position shown in Fig. 3, at which time the arm 28 is beyond the pin 20 and the projection 12 again rests against the periphery of the wheel 13. The notch is so chosen so as to make the particular instrument responsive to a certain number of cycles.

At the central station, as will appear, suitable calling devices are of course provided which may be likened to a counting pole changer whereby to send the necessary cycles to call any desired station. Such a counting device, of course, must have a number of given setting positions depending upon the number of stations on the line. Now in order to increase the capacity of the system without increasing the size of call boxes by increasing their setting positions, I provide a reversing element at the sending station so as to reverse the polarity of the current impressed which practically amounts to the same thing as eliminating the first impulse, and in this manner the shaft 25 will be stopped a half cycle earlier than would be the case if the ordinary number of cycles were sent without the reversing device. This may be more readily understood by assuming that the device shown in Fig. 1 is designed to respond after two complete cycles have been sent, which means two positive and two negative impulses. Assuming that the last impulse is always a negative impulse which leaves the armature 6 in the position shown in Fig. 1, then the first impulse naturally should always be a positive impulse. Thus four impulses, two positive and two negative, beginning with a positive impulse will move the shaft 25 through what I have chosen to call two cycles. Now however, should I use a reversing switch at the central station so that instead of sending the impulses in the order of positive, negative, positive, negative, these four impulses are sent negative, positive, negative, positive, then it will be readily apparent that the first negative impulse will not move the armature 6 and the three succeeding impulses will move the shaft 25 through a space of one and one-half cycles. The same reasoning applies with any number. For instance, if we have a station that would respond to six cycles and we used the reversing switch, then the particular elements of the substation would stop at five and one-half cycles. In this case, of course, the notches 23 must be made narrower than shown in the figures so that each notch has a width corresponding only to a half cycle movement of the shaft 25 as will be readily apparent, and of substantially the width of the projection 12.

It will thus be seen how in a very simple manner I may increase the capacity of the device under discussion.

Referring now particularly to Fig. 7, wherein I show my device as of use, I have a central station A and a substation B, although other substations are intended to be added to the number required. I have indicated the selector described in Figs. 1 to 6 inclusive at the substation B by the coil 1, the rotating plate 13, and the movable element 9, this movable element closing circuit through the springs 14 and 15. The device is connected in bridge of the line wires 37 and 38, which line wires unite the stations together. An adjustable resistance 40 is provided serially with the device to adjust for line conditions. A lightning arrester 41 is shown as likewise fuses 42, 42. At the central station I have a pole changing device as explained more in detail in my co-pending application Serial No. 694,215, filed April 30, 1912, in which a shaft 43 carries two conducting rings 44 and 45 respectively associated with commutator segments 46 and 47. Brushes 48 and 49 are associated with the commutator segments and brushes 50 and 51 are respectively associated with the rings 44 and 45. The shaft 43 is suitably rotated to transmit cycles (each cycle meaning a positive impulse and a negative impulse) and a suitable counting mechanism to count the number of cycles is utilized to operate the shaft 43 in accordance with the disclosure made in my co-pending application Serial No. 690,727, filed April 15, 1912. A battery 52 furnishes the current. A condenser 53 is bridged across the line wires to take the discharge due to sparking and a non-inductive resistance 54 is bridged across the condenser so that the condenser discharge will not operate the selectors. The shaft 43 may then be operated to call any desired station. In order to operate the device so that it may occupy one-half cycle positions I use a reversing key 55 which merely reverses the polarity of the battery current from the battery 52 as supplied to the brushes 50 and 51. I utilize a key 56 which when operated closes the battery circuit to the pole changer and also closes the battery circuit from the pole changer to the line. I show a second key 57 which is associated with an operator's telephone set 58 and which connects this operator's telephone set in bridge of the line for talking purposes as will be readily apparent. I likewise provide at the central station a balancing coil 59 bridged across the line wires between whose neutral point a relay 60 is connected through a battery 61 to earth at 62, which relay has an armature 63 to control by means of a battery 64 suitable registrations upon a register of the ordinary telegraph type 65, which registrations are used as answer-back or return indications for devices provided at the substations which will now be explained.

Whenever a station is selected, contact is closed between springs 14 and 15 which thereupon establish a circuit from spring 15, through conductor 66, relay 67, conductor 68, visual signal 69 for the motorman, resistance 70, hand switch 71, trolley wire 72, generator 73, ground 74, ground 75, conductor 76, spring 77, spring 78, conductor 79, spring 14, contact element 80 to spring 15. The lamp 69 is thus lighted somewhere along the right of way to call a trainman and at the same time the armature 81 of the magnet 67 is attracted to operate a catch 82 to thereby release an answer-back mechanism and at the same time to close circuit through springs 83 and 84. Closing the circuit through the springs 83 and 84 places a closed circuit across the springs 14 and 15 so that the substation calling device may be restored without breaking the continuity of the circuit through the relay 67 and signal 69. The answer-back device is spring operated by means of the spring 85 in a contra-clockwise direction so that the arm 86 engages a stop 87, during which motion a segmental wheel 88 is operated to periodically close circuit between springs 89 and 90, thereby periodically grounding the line wire 37 to operate the relay 60 in response to said groundings. As soon as the trainman arrives at the signal 69 he inserts a plug 91 into the jack 92 and may then converse by means of the telephone set 93 with the train despatcher's telephone apparatus 58.

It may be said, of course, that the operations of the answer-back device are registered upon the register 65 to indicate that the proper substation instrument has been selectively operated. The trainman then operates the handle 86 in a clockwise direction from the position it has occupied against the stop 87 into the position it occupies in the illustration, at which time this arm has opened circuit through the springs 77 and 78, thereby breaking circuit through the relay 67 to permit the restoration of all parts to normal and again holding the answer-back device by means of the detent 82. This restoration of the answer-back device winds it up so as to be ready for another operation. A switching key comprising the springs 94 and 95 at each substation may be used to ground the line conductor 37 to thereby manipulate the registering device 65 so that the trainman may signal the central office should communication be desired.

While I have herein shown and particularly described one form of carrying out my invention, I do not mean to limit myself to such specific description and illustration, but—

Having thus described one embodiment of my invention, what I claim as new and desire to secure by Letters Patent is:

1. A signaling system having a central station and substations all united by the same circuit, and including a step-by-step signal receiving device at each substation, means at the central station operable over said circuit to select for operative operation any substation, an answer-back device at each substation adapted to send indications over said circuit, a signal at each substation, means for normally preventing said answer-back device from operating, means whereby the answer-back device is released whenever its corresponding signal is operated, means for restoring said answer-back device and effacing said signal, a signal receiving device at the central station adapted to receive said answer-back indications, and means at each substation operable over said circuit to actuate said central station signal receiving device independently of said answer back device.

2. A signaling system having a central station and substations all united by the same circuit, and including a step-by-step signal receiving device at each substation, means at the central station operable over said circuit to select for operative operation any substation, an answer-back device at each substation adapted to send indications over said circuit, a signal at each substation, means for normally preventing said answer-back device from operating, means whereby the answer-back device is released whenever its corresponding signal is operated, means for restoring said answer-back device and effacing said signal, and a signal receiving device at the central station adapted to receive said answer-back indications, said answer-back releasing means having means under its control to actuate said signal.

3. A signaling system having a central station and substations all united by the same circuit, and including a step-by-step signal receiving device at each substation, means at the central station operable over said circuit to select for operative operation any substation, an answer-back device at each substation adapted to send indications over said circuit, a signal at each substation, means for normally preventing said answer back device from operating a relay whereby the answer-back device is released whenever its corresponding signal is operated, means for restoring said answer-back device and effacing said signal, a signal receiving device at the central station adapted to receive said answer-back indications, and means whereby said relay when actuated maintains its actuated position, said restoring means controlling the restoration of said relay.

4. A signaling system having a central station and substations all united by the same circuit, and including a step-by-step signal receiving device at each substation, means at the central station operable over said circuit to select for operative operation any substation, an answer-back device at each substation adapted to send indications over said circuit, a signal at each substation, means for normally preventing said answer-back device from operating a relay whereby the answer-back device is released whenever its corresponding signal is operated, means for restoring said answer-back device and effacing said signal, a signal receiving device at the central station adapted to receive said answer-back indications, and means whereby said relay when actuated maintains its actuated position, said restoring means controlling the restoration of said relay, said central station selecting device including a pole changer.

5. A signaling system having a central station and substations all united by the same circuit, and including a step-by-step signal receiving device at each substation, means at the central station operable over said circuit to select for operative operation any substation, an answer-back device at each substation adapted to send indications over said circuit, a signal at each substation, means for normally preventing said answer-back device from operating means whereby the answer-back device is released whenever its corresponding signal is operated, means for restoring said answer-back device and effacing said signal, and a signal receiving device at the central station adapted to receive said answer-back indications, said answer-back device having means under its control to actuate said signal receiving device, said central station selecting device including a pole changer, a condenser bridged across said circuit, and a non-inductive resistance bridged across said circuit.

6. A signaling system having a central station and substations all united by the same circuit, and including a step-by-step signal receiving device at each substation, means at the central station operable over said circuit to select for operative operation any substation, an answer-back device at each substation adapted to send indications over said circuit, a signal at each substation, means for normally preventing said answer-back device from operating a relay whereby the answer-back device is released whenever its corresponding signal is operated, means for restoring said answer-back device and effacing said signal, a signal receiving device at the central station adapted to receive said answer-back indications, and means whereby said relay when actuated maintains its actuated position, said restoring means controlling the restoration of said relay, said central station selecting device including a pole changer, a condenser bridged across said circuit and a non-inductive resistance bridged across said circuit.

7. A signaling system comprising a central station and substations united by a circuit, a step-by-step signal receiving device at each substation having means whereby it is adapted to occupy two resting positions per impressed cycle of alternating current, one of said positions being its normal starting position, means at the central station for impressing cycles of current to operate said step-by-step device into different operative positions corresponding respectively to the impressed cycles, and a switching device at the central station to reverse the polarity of the cycles so that said substation signal receiving device can also occupy positions corresponding to one-half cycles.

8. A signaling system having a central station and substations united by a circuit, a step-by-step signal receiving device at each substation having escapement operating means adapted to occupy two resting positions per impressed cycle of alternating current, one of said positions being its normal starting position, devices at the central station for impressing cycles of operating current to operate said step-by-step device into different operative positions corresponding respectively to the impressed cycles, and a switching device at the central station to reverse the polarity of the cycles whereby said escapement means and said substation signal receiving devices occupy resting positions corresponding to half cycles.

9. A signaling system having a central station and substations united by a circuit, a step-by-step signal receiving device at each substation having escapement operating means, devices at the central station for impressing cycles of operating current to operate said step-by-step device into different operating positions corresponding respectively to the impressed cycles, a polarized operating armature at each substation to control the operation of said escapement occupying a normal resting position from which it is responsive to the polarity of current forming the first impulse of each cycle, and a switching device at the central station to reverse the polarity of the impressed cycles whereby the substation polarized armature remains unresponsive to the first impulse so that the substation step-by-step device will occupy positions intermediate to the cycle positions.

In witness whereof, I hereunto subscribe my name this 5th day of April, A. D., 1912.

OTTO T. LADEMAN.

Witnesses:
MAX W. ZABEL,
HAZEL JONES.